United States Patent
Kiley et al.

(10) Patent No.: US 6,802,484 B1
(45) Date of Patent: Oct. 12, 2004

(54) STAND ACCESSORY HOLDER

(76) Inventors: Kevin J. Kiley, 5800 Lumberjack La., Tall, FL (US) 32303; Danny Joe Crutchfield, 4170 Fairhill Way, Tall., FL (US) 32309; David B. Thompson, 5751 Cypress Cir., Tallahassee, FL (US) 32303; Johnny W Mills, 767 Frank Smith Rd., Quincy, FL (US) 32352

( * ) Notice: Subject to any disclaimer, the term of this patent is extended or adjusted under 35 U.S.C. 154(b) by 0 days.

(21) Appl. No.: 10/634,353

(22) Filed: Aug. 5, 2003

(51) Int. Cl.$^7$ ................................. A47K 1/08
(52) U.S. Cl. ................. 248/311.2; 248/121; 248/218.4; 248/316.7
(58) Field of Search .................. 248/230.1, 231.71, 248/231.81, 316.7, 311.2, 121, 316.8, 122.1, 125.1, 125.7, 125.8, 125.9, 218.4, 219.4, 219.2, 229.26, 227.3; 211/107, 133.4; 84/327

(56) References Cited

U.S. PATENT DOCUMENTS

| | | | |
|---|---|---|---|
| 3,003,646 A * | 10/1961 | Wolf | ........................ 211/107 |
| 4,501,201 A | 2/1985 | Fitzner et al. | |
| 5,007,612 A | 4/1991 | Manfre | |
| 5,070,539 A | 12/1991 | Cheng | |
| 5,165,631 A | 11/1992 | Norsworthy | |
| 5,299,485 A | 4/1994 | Denton | |
| 5,313,866 A | 5/1994 | Smith | |
| 5,524,646 A | 6/1996 | Reich | |
| 5,728,959 A | 3/1998 | O'Rorke | |
| 5,842,671 A * | 12/1998 | Gibbs | ..................... 248/231.41 |
| 6,255,569 B1 | 7/2001 | Ward | |
| 6,323,405 B1 * | 11/2001 | Yu | ............................... 84/327 |
| 6,325,350 B1 | 12/2001 | Mancuso | |
| 6,443,172 B2 * | 9/2002 | Brumfield | ..................... 135/16 |
| 6,443,407 B1 | 9/2002 | Ibrahim | |
| 6,527,240 B1 | 3/2003 | Huang | |
| 6,588,716 B1 * | 7/2003 | Heid | ........................ 248/125.8 |

* cited by examiner

Primary Examiner—Ramon O Ramirez
(74) Attorney, Agent, or Firm—John Wiley Horton

(57) ABSTRACT

An accessory holder designed to attach to a stand. The stand has a lower tube, a locking collet on the top of the lower tube, and a mast extending upward from the locking collet. The accessory holder has a top mount with a mast receiver that slips around the mast just over the top of the locking collet. The accessory holder also has a clip designed to slip around and engage the mast below the locking collet in the order to lock the holder to the stand. A variety of holding devices can be affixed to the accessory holder, including devices configured to hold an ashtray, a beverage, and a pick.

12 Claims, 9 Drawing Sheets

STAND ACCESSORY HOLDER

BACKGROUND OF THE INVENTION

1. Field of the Invention

This invention relates to the field of music. More specifically, the invention comprises an accessory holder which can be attached to a prior art microphone stand, music stand, or similar article.

2. Description of the Related Art

Modern musical bands typically perform with a wealth of electronic amplification equipment. Microphones are commonly used. For those musicians playing instruments, it is common to mount the microphone on a separate stand. FIG. 1 shows a prior art microphone stand 10. A heavy base (not shown) rests on the floor. Tube 12 extends upward from the base. Locking collet 14 mounts to the top of tube 12. Mast 18 extends upward through locking collet 14. It carries microphone clip 20 which, in turn, mounts microphone 22. Cord 24 leads to the amplification equipment.

Those skilled in the art will know that the height of microphone 22 is adjusted by loosening locking collet 14 and sliding mast 18 in and out of tube 12. Once the desired height is obtained, locking collet 14 is turned clockwise until it is tight. This action frictionally engages mast 18 within tube 12. Those skilled in the art will also know that the particular type of microphone stand shown is but one of many. The features depicted are typical however. It is also true that similar stands are used for other purposes, such as holding sheet music.

While not intending to cast aspersions on musicians in general, it is commonly known that many members of that profession like to smoke and drink while performing. This presents a dilemma for the musician He or she must generally use both hands to play the instrument. A beverage or cigarette must therefore be lad down somewhere on the stage, producing trip and fie hazards.

BRIEF SUMMARY OF THE INVENTION

The present invention comprises accessory holder designed t o attach to a microphone stand or simile article. The microphone s stand has a lower tube, a lock colt on the top of the lower tube, and a mast extending upward from the locking colt. The accessory holder has a top mount with a mast receiver that slips around the mast just over the top of the locking collet. The accessory holder also has a clip designed to slip around and engage the mast below the locking collet in order to lock the holder to the microphone stand. A variety of holding devices can be affixed to the accessory holder, including devices configure to hold an ashtray, a beverage, and a pick.

Figure 1:
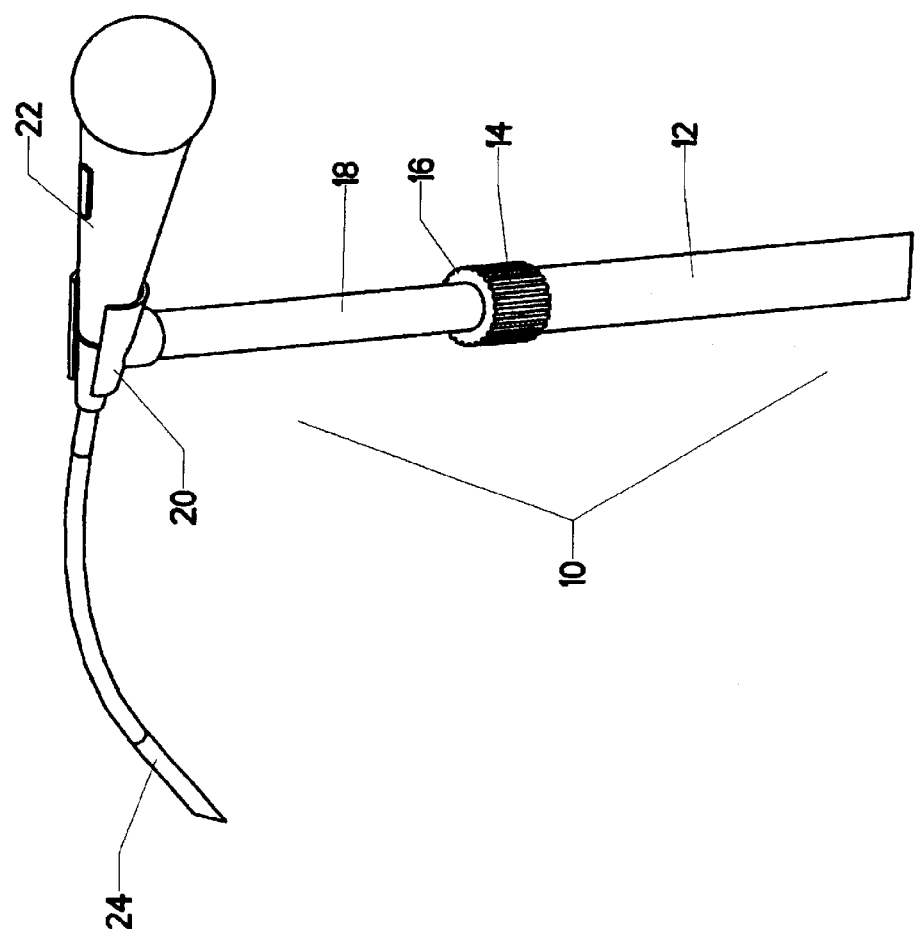
FIG. 1 is an isometric view, showing a prior art microphone stand.

| REFERENCE NUMERALS IN THE DRAWINGS | |
|---|---|
| 10 | microphone stand |
| 12 | tube |
| 14 | locking collet |
| 16 | top surface |
| 18 | mast |
| 20 | microphone clip |
| 22 | microphone |
| 24 | cord |
| 26 | accessory holder |
| 28 | top mount |
| 30 | clip |
| 32 | tray shelf |
| 34 | beverage shelf |
| 36 | beverage arm |
| 38 | neck |
| 40 | tube receiver |
| 42 | neck |
| 44 | mast receiver |
| 46 | pick holder |
| 48 | tab |
| 50 | wall |
| 52 | wall |
| 54 | pick |
| 56 | bottle |
| 58 | ashtray |
| 60 | cigarette |
| 62 | molded accessory holder |
| 64 | integral ashtray |
| 66 | beverage holder |

DETAILED DESCRIPTION OF THE INVENTION

Returning briefly to FIG. 1, the reader will observe that locking collet 14 has top surface 16. The locking collets vary from type to type of microphone stand, but they all have a diameter which is larger than the diameter of mast 18. Some have flat top surface 16 and some are other shapes, but they all have a top surface which is a greater diameter than mast 18. This fate is used to advantage by the present invention. The reader should bear in mind that a microphone stand is merely used as an example throughout this disclosure. Any type of stand having features similar to those shown in FIG. 1 is suitable for mounting the present invention. Thus, the present invention can be used with music stands, drum mounting hardware, and the like.

Figure 2:
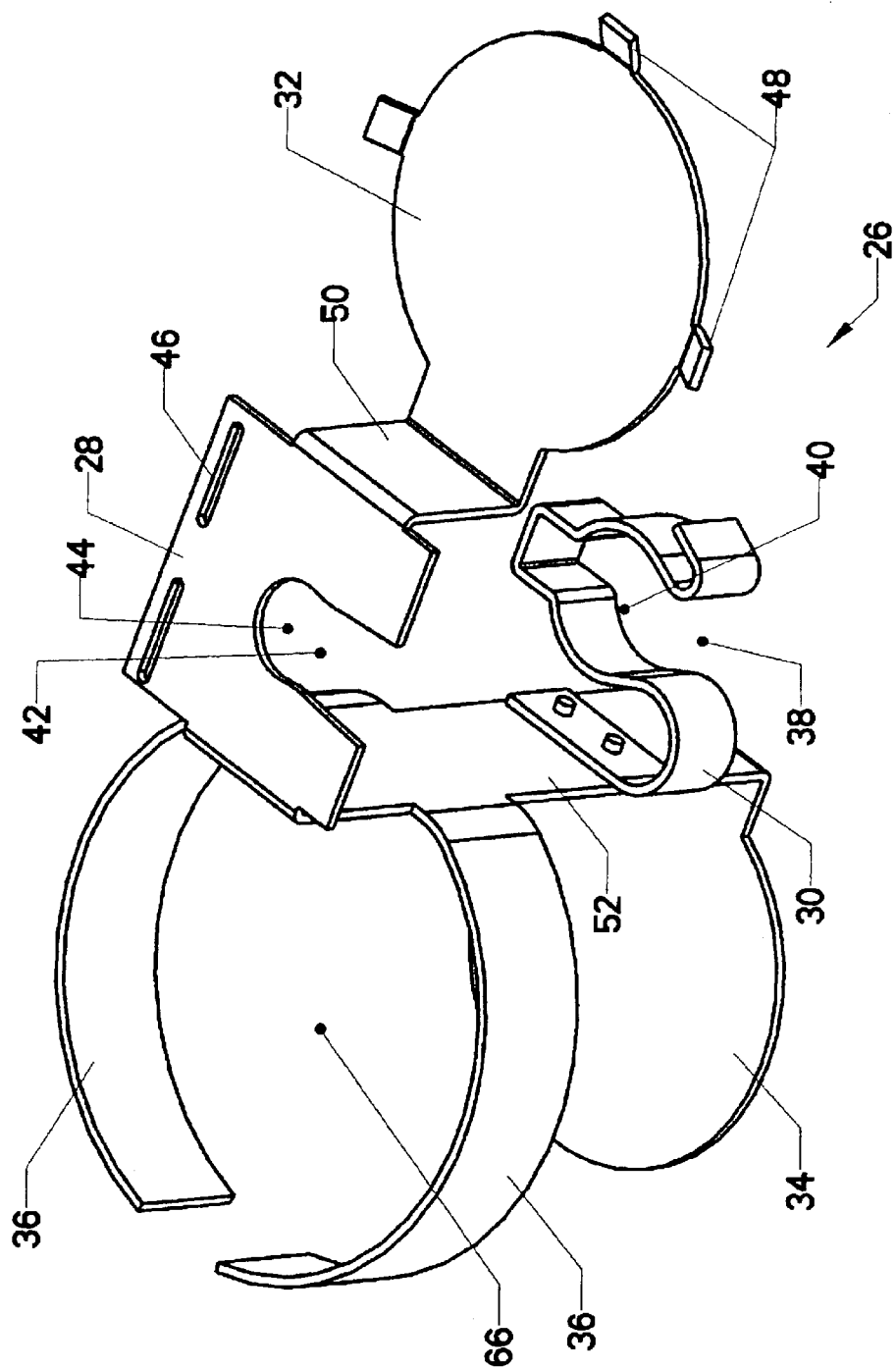
FIG. 2 is an isometric view, showing the proven invention.

FIG. 2 shows accessory holder 26. Its various elements attach to top mount 28, which has an upper surface and a lower surface. Mast receiver 44 is located near the center of top mount 28. It is essentially a slot, having one open side and one closed side. Neck 42 is a slight constriction located between the open side of the slot and mast receiver 44. Top mount 28 preferably includes one or more pick holders 46, which are configured to receive picks used far playing guitars, mandolins, and the like.

Wall 50 connects ash tray shelf 32 to top mount 28. Tray shelf 32, which is generally circular, is bounded by wall 50 and three upturned tabs 48. Wall 52 connects beverage holder 66 to top mount 28. Beverage holder 66 is formed by beverage shelf 34 and two beverage arms 36.

Wall 52 is also used to attach clip 30. This feature, which is typically made of resilient metal, is also a slot having one open end and one closed end. Tube receiver 40 is an approximately circular form located near its center. Neck 38 lies between tube receiver 40 and the open end of the slot.

Figure 3:
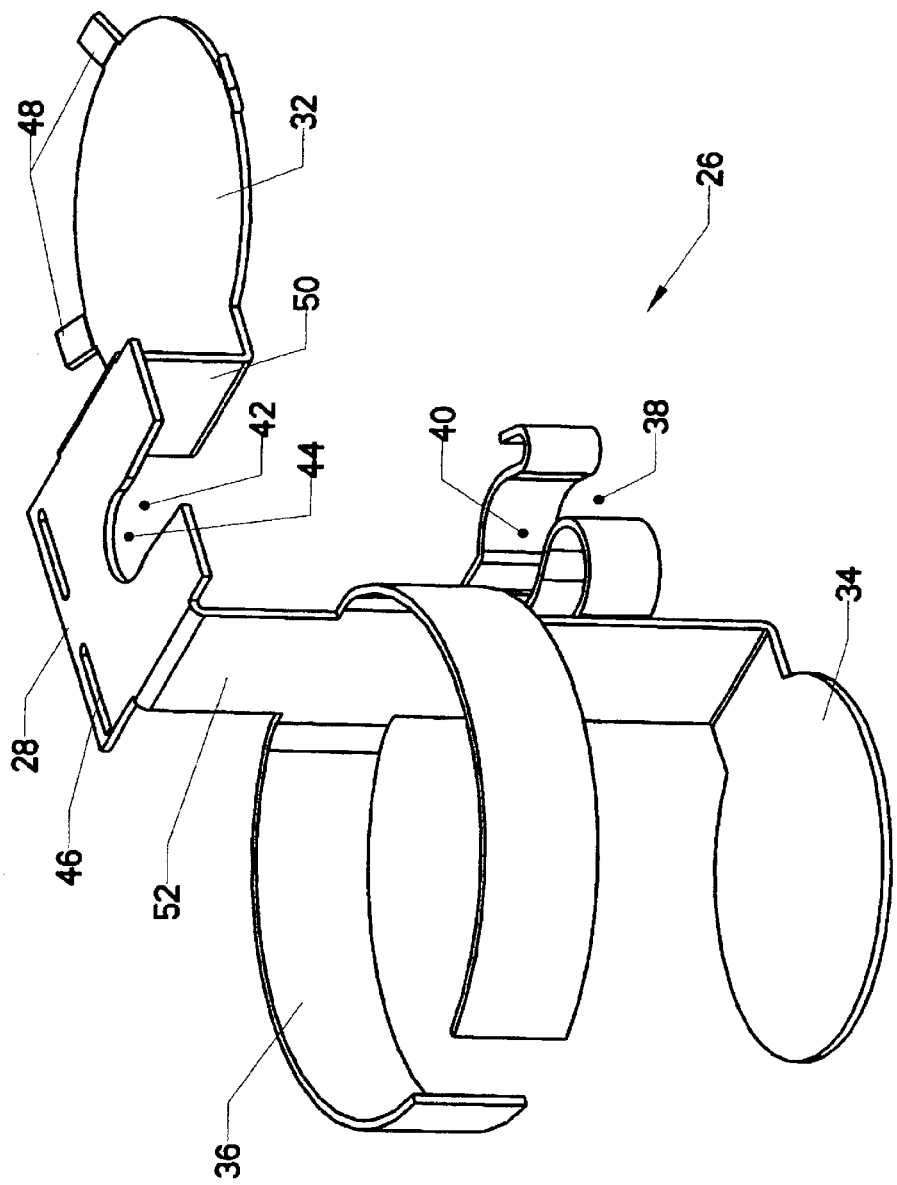
FIG. 3 is an isometric view, showing the present invention.

FIG. 3 shows accessory holder 26 from a different perspective. Like numerals designate like features throughout this disclosure.

Figure 4:
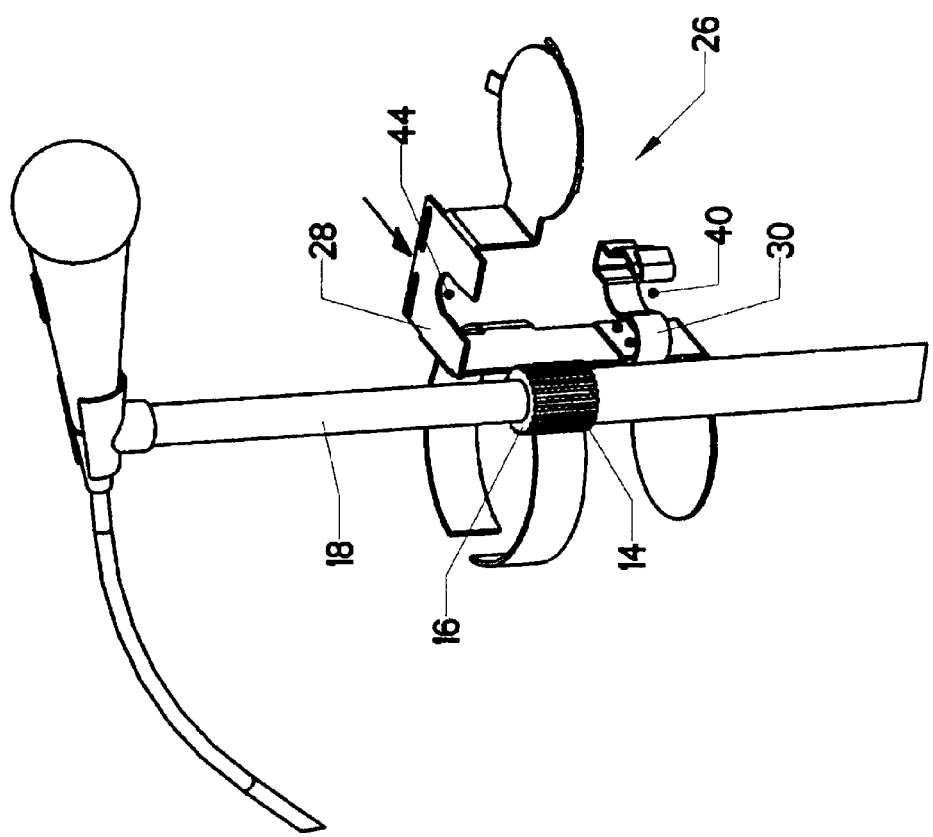
FIG. 4 is an isometric view, showing the installation of the present invention.

FIG. 4 shows the installation of the device onto a prior art microphone stand. The user slides top mount 28 over locking collet 14, with mast receiver 44 slipping over mast 18. Accessory holder 26 is preferably made of resilient material—such as metal or plastic. Neck 42 is just wide enough to allow mast receiver 44 to snap over mast 18 (preferably with a small amount of elastic deformation, so that mast receiver 44 frictionally engages mast 18). Clip 30 likewise snaps over tube 12, with tube receiver 40 surrounding tube 12. Clip 30 may be made of very resilient material—such as spring steel. This allows neck 38 to be made significantly smaller than tube 12 so that clip 30 snaps smartly into position on tube 12.

Figure 5:
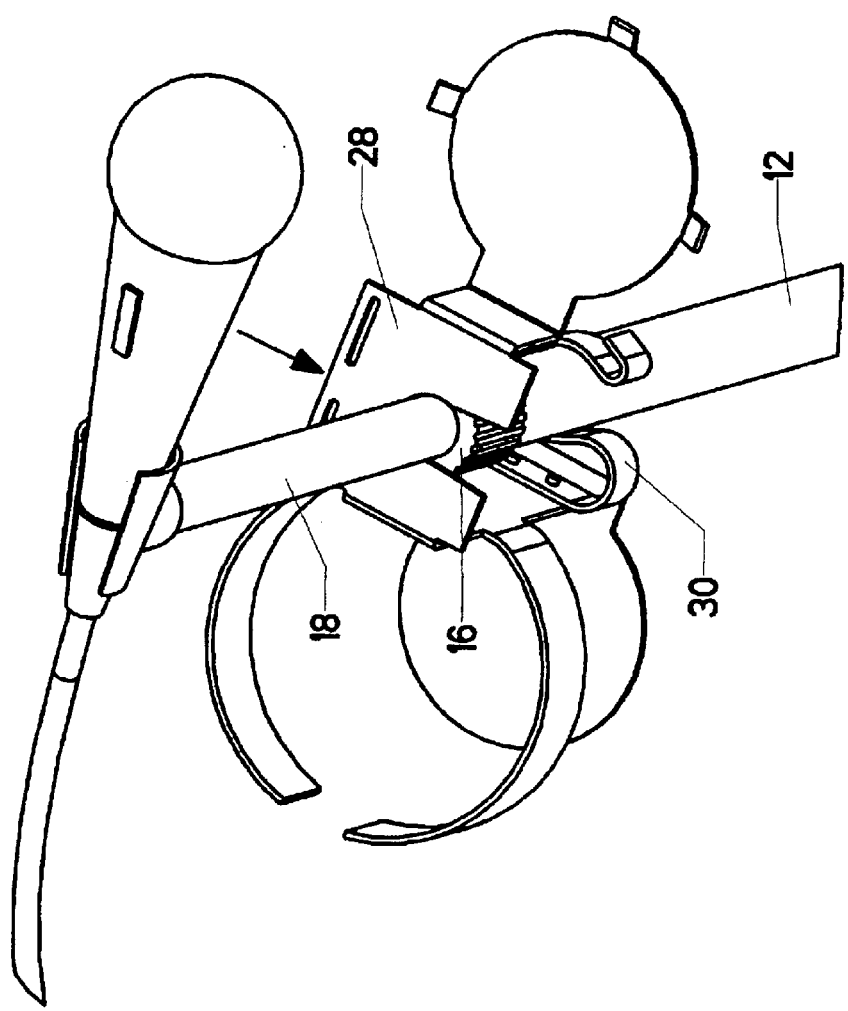
FIG. 5 is an isometric view, showing the installation of the preset invention.

FIG. 5 shows the invention in its installed position. The arrow indicates the direction in which the user pushes the device to install it on the microphone stand. Top mount 28 then rests over top since 16 of locking collet 14. Owing to this orientation, any weight placed on accessory holder 26 will be transmitted primarily to top surface 16 of locking collet 14.

Figure 6:
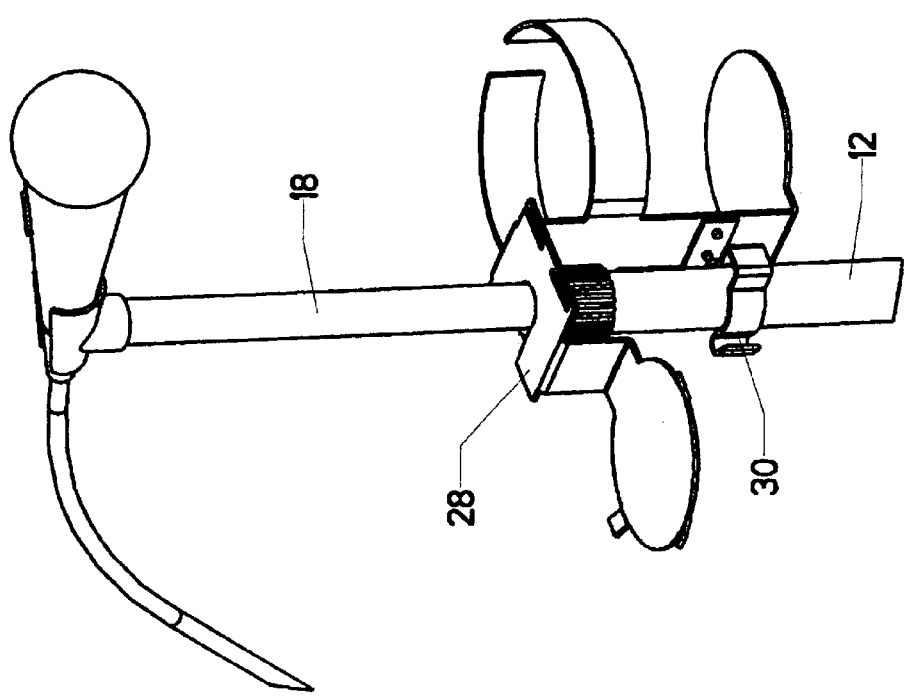
FIG. 6 is an isometric view, showing the installation of the present invention.

FIG. 6 illustrates the fact that the invention can be rotated around the microphone stand in the installed position. Thus, the user can easily select a desired rotational orientation Once this position is achieved, fiction tends to hold the device in place.

Figure 7:
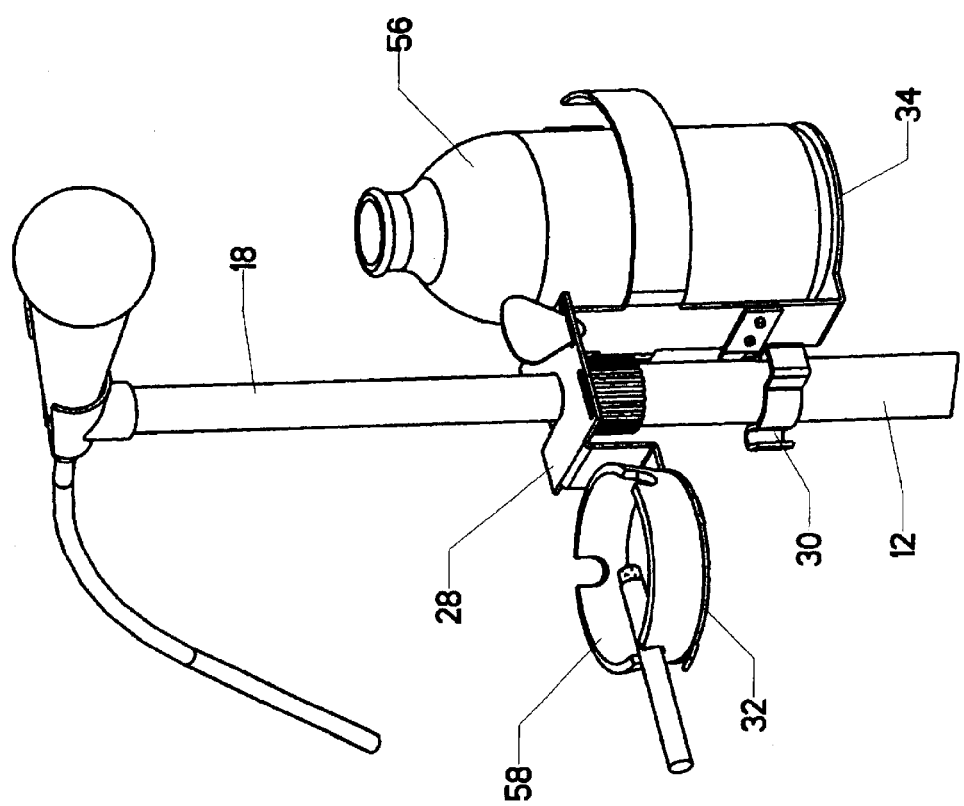
FIG. 7 is an isometric view, showing the pre invention in use.

FIG. 7 shows the invention actually holding accessories. Bottle 56 has been placed on beverage shelf 34. Those skilled in the art will realize that beverage holder 66 will also accommodate cans, cups, glasses, and similar beverage containers. Pick 54 is retained within a pick holder 46. Ashtray 58 is secured by tray shelf 32 and the three tabs 48. Cigarette 60 may then be placed in ashtray 58. Of course, tray shelf 32 can accommodate many things other than an ash tray. As one example, it can be used to hold a small dish for mints.

Figure 8:
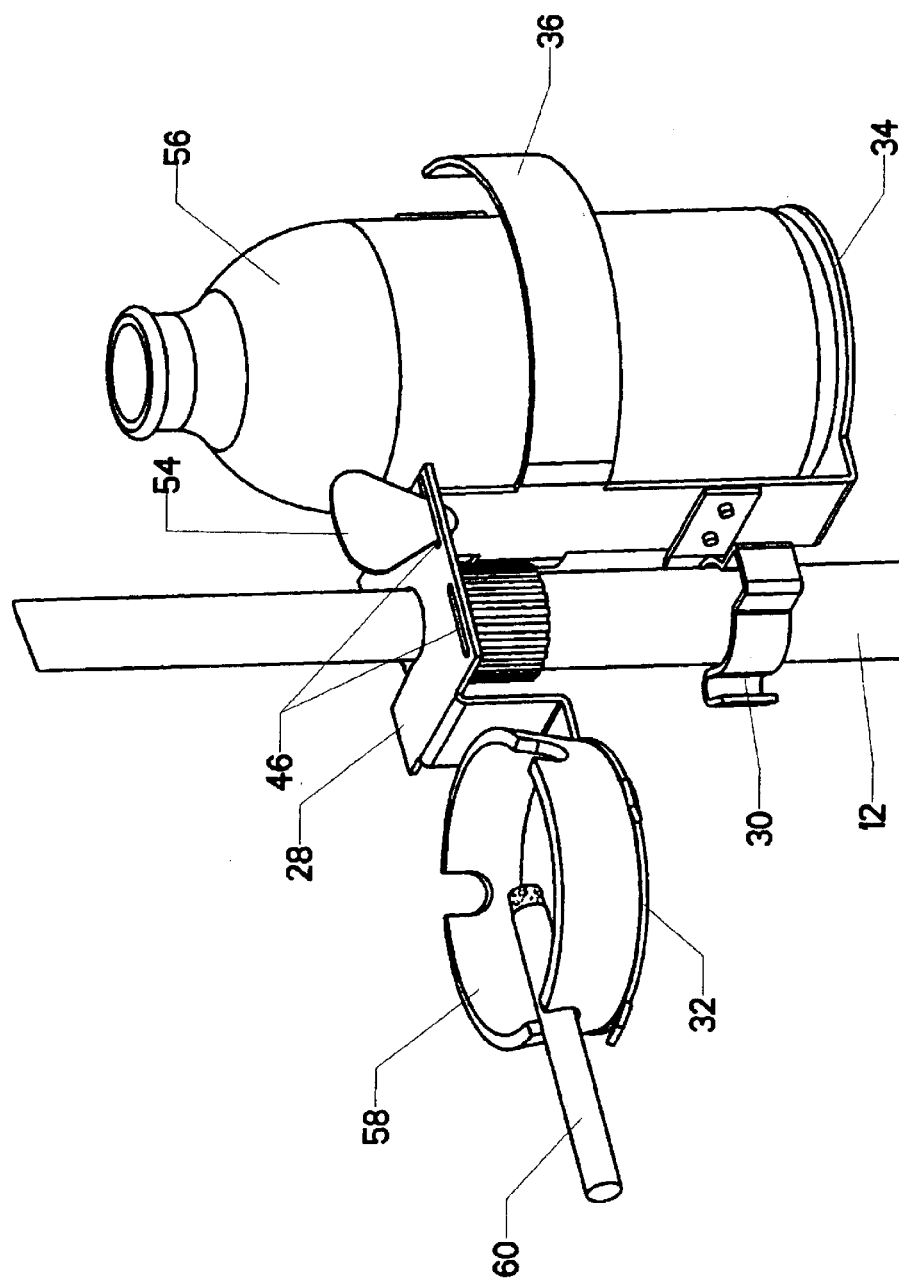
FIG. 8 is an isometric view, shadow th e present invention in use.

FIG. 8 shows a closer view of the same assembly. The reader will observe that top mount 28 rests on top of locking collet 14. Clip 30 stabilizes the device in the position shown. Heavy objects, such as fill liquid bottles can be placed in the invention without fear of its coming loose. Because it transmits the load directly to the microphone stand—which is a very sturdy article—heavy objects do not pose a problem.

Figure 9:
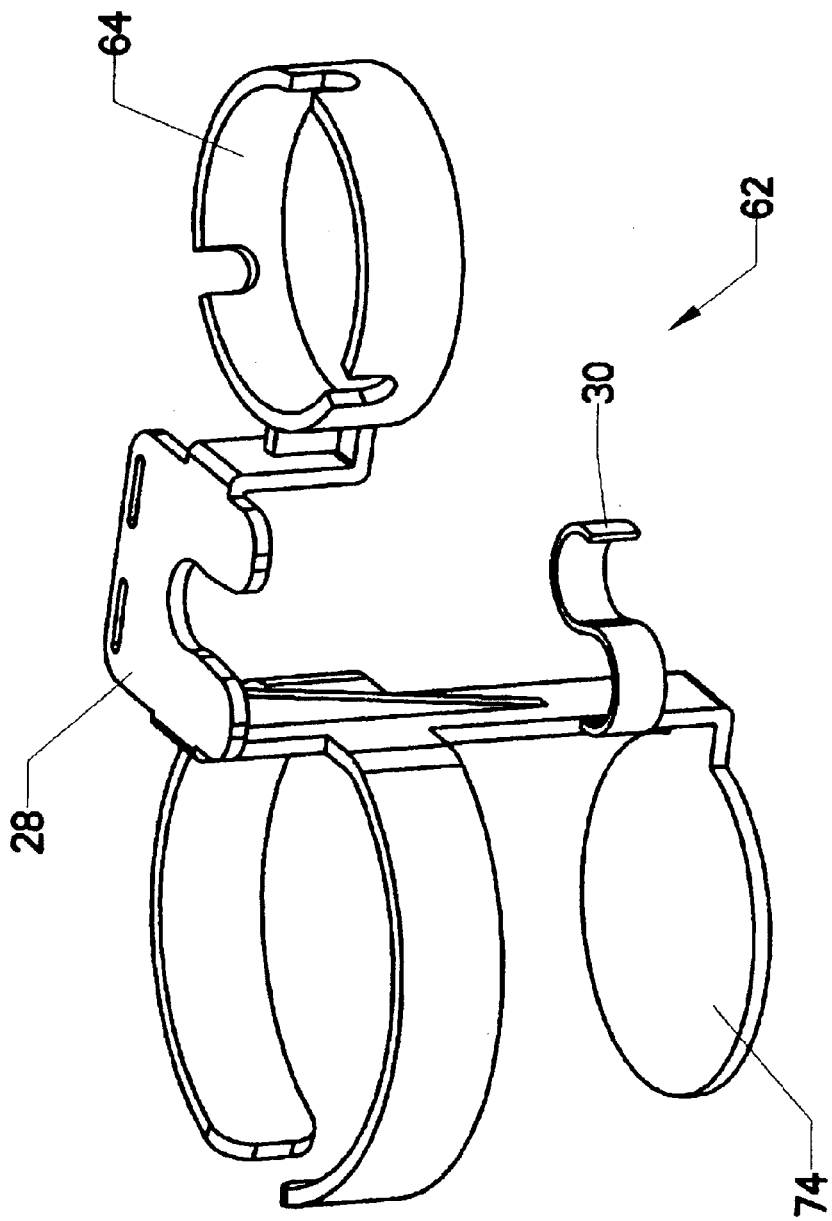
FIG. 9 is an isometric view, showing an alternate embodiment made of molded plastic.

The version of the invention shown in FIGS. 2 through 8 represents a sheet metal product made by stamping and forming. Those skilled in the art will realize that many other methods could be used to make the invention. FIG. 9 shows a molded plastic version designated as molded accessory holder 62. Certain shapes have been altered to conform to principles of plastic design, but the reader will appreciate that the basic components are the same. Of course, the use of molded plastic allows the integration of some components. As one example, integral ashtray 64 can be molded as part of the accessory holder, thereby eliminating the need for a separate ash tray. An integrally molded dish could be substituted for the integral ashtray (It would likely be the same shape without the cigarette-holding relief cuts).

The preceding description contains significant detail regarding the novel aspects of the present invention. It should not be construed, however, as limiting the scope of the invention but rather as providing illustrations of the preferred embodiments of the invention. Thus, the scope of the invention should be fixed by the following claim rather than by the examples given.

We claim:

1. An accessory holder for mounting accessories to a stand, wherein said stand includes a tube, a locking collet located on the top of said tube, and a mast extending upward from said locking collet, comprising:
   a. top mount, having an upper surface and a lower surface;
   b. a mast receiver in said top mount, having one open side and one closed side, wherein said open side is sized to admit said mast so that said mast receiver can be slid onto said mast with said lower surface of said top mount resting on top of said locking collet;
   c. a clip, attached to said top mount, wherein said clip includes a tube receiver for receiving said tube, so that said clip can be clipped onto said tube when said top mount is slid onto said mast; and
   d. a first accessory holding means, attached to said top mount.

2. An accessory holder as recited in claim 1, wherein said first accessory holding means comprises a tray shelf.

3. An accessory holder as recited in claim 1, wherein said first accessory holding means comprises a beverage holder.

4. An accessory holder as recited in claim 1, wherein said first accessory holding means comprises a pick holder.

5. An accessory holder as recited in claim 2, farther composing a beverage holder.

6. An accessory holder as recited in claim 5, further comprising a pick holder.

7. An accessory holder as recited in claim 2, further comprising a pick holder.

8. An accessory holder as recited in claim 3, further comprising a pick holder.

9. An accessory holder for mounting accessories to a stand, wherein said stand includes a tube, a locking collet located on the top of said tube, and a mast extending upward from said locking collet, comprising:
   a. a top mount, having an upper surface and a lower surface;
   b. a mast receiver in said top mount, having one open side and one closed side, wherein said open side is said to admit said mast so that said mast receiver can be slid onto said mast with said lower surface of said top mount resting on top of said locking collet;
   c. a clip, attached to said top mount, wherein said clip includes a tube receiver for receiving said tube, so that said clip can be clipped onto said tube when said top mount is slid onto said mast; and
   d. a tray, attached to said top mount.

10. An accessory holder as recited in claim 9, further comprising a beverage holder.

11. An accessory holder as recited in claim 10, further comprising a pick holder.

12. An accessory holder as recited in claim 9, further comprising a pick holder.

* * * * *

UNITED STATES PATENT AND TRADEMARK OFFICE
CERTIFICATE OF CORRECTION

PATENT NO. : 6,802,484 B1  
DATED : October 12, 2004  
INVENTOR(S) : Kiley et al.

Page 1 of 1

It is certified that error appears in the above-identified patent and that said Letters Patent is hereby corrected as shown below:

<u>Column 7,</u>
Line 15, add -- a -- before "top mount, having,.."

<u>Column 4,</u>
Line 16, delete "rcceiver" and insert therefor -- receiver --
Lines 33 and 34, delete "farther composing" and insert therefor -- further comprising --

<u>Column 4,</u>
Lines 48 and 49, delete "said open side is said to admit" and insert therefor -- said open side is sized to admit --

Signed and Sealed this

First Day of February, 2005

JON W. DUDAS  
*Director of the United States Patent and Trademark Office*